(No Model.) 2 Sheets—Sheet 1.

M. T. RIDOUT.
RAILWAY CAR.

No. 260,788. Patented July 11, 1882.

ATTEST:
C. Clarence Poole
J. C. Turner

INVENTOR:
M. T. Ridout
By his atty
R. D. O. Smith (No Model.) 2 Sheets—Sheet 2.

M. T. RIDOUT.
RAILWAY CAR.

No. 260,788. Patented July 11, 1882.

ATTEST:
C. Clarence Poole
J. C. Turner

INVENTOR:
M. T. Ridout
By his atty
R. D. Smith

UNITED STATES PATENT OFFICE.

MOSES T. RIDOUT, OF LAKESIDE, MINNESOTA.

RAILWAY-CAR.

SPECIFICATION forming part of Letters Patent No. 260,788, dated July 11, 1882.

Application filed April 27, 1881. (No model.)

*To all whom it may concern:*

Be it known that I, MOSES T. RIDOUT, of Lakeside, Renville county, in the State of Minnesota, have invented a new and useful Improvement in Railway-Cars for the Transportation of Cattle; and I do hereby declare that the following is a full and complete description of the same, reference being made to the accompanying drawings, wherein—

Figures 1, 5, 6:
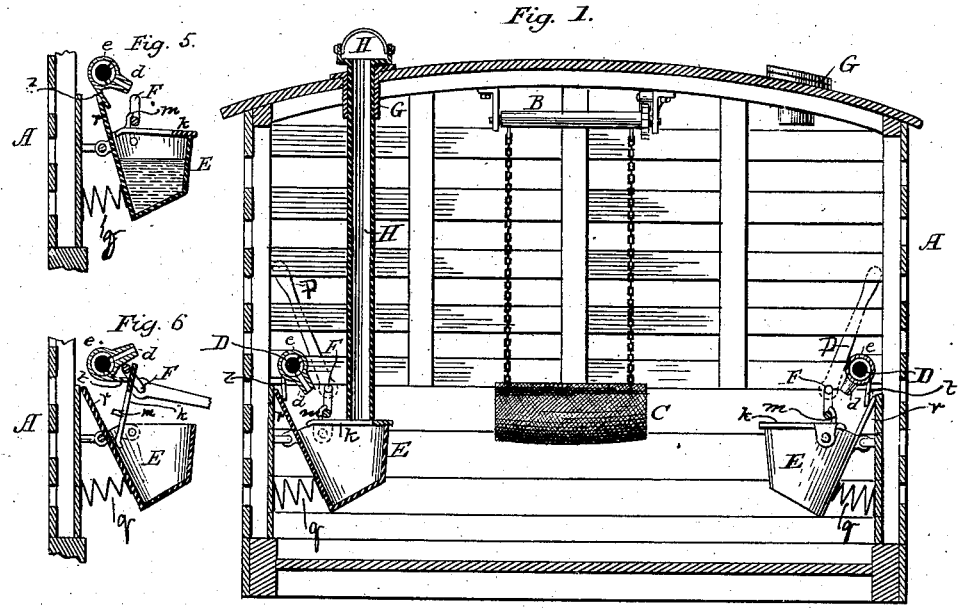
Figure 2:
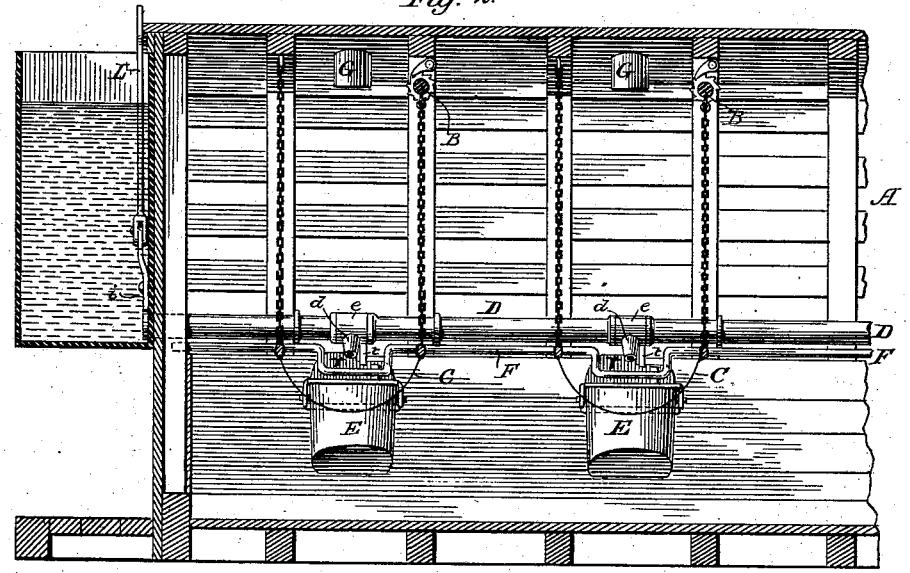
Figure 3:
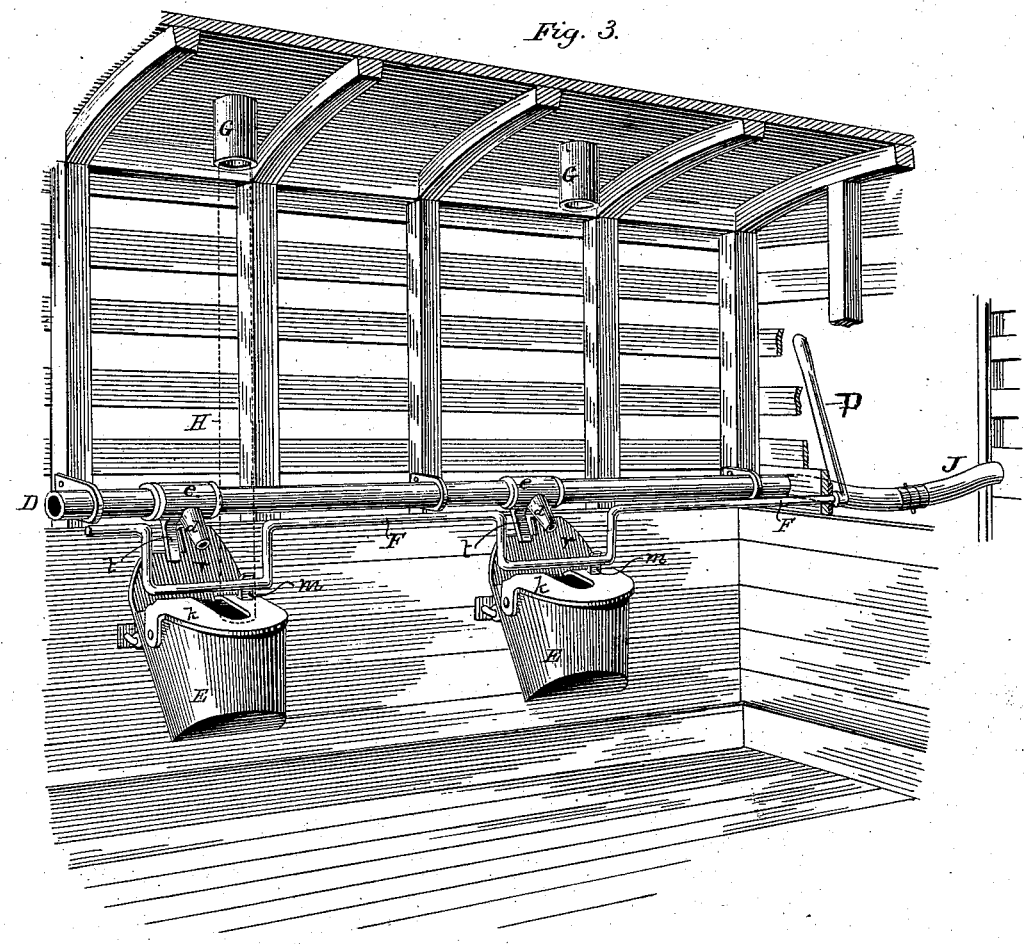
Figure 4:
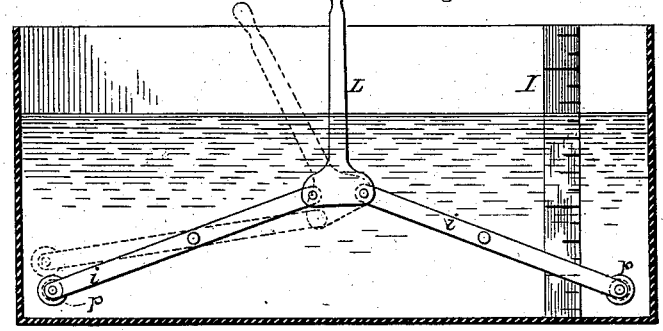

Figure 1 is a sectional perspective of my invention in operative condition. Fig. 2 is a longitudinal section of the same. Fig. 3 is a transverse section. Fig. 4 is a longitudinal section of the water-tank.

In the transportation of cattle by railway a variety of practical difficulties are encountered, and I will specify the more important ones which my invention will remove or mitigate.

It has been found advantageous to place in each car the largest practicable number of cattle, because in so doing they support each other against the effects of the jolting and jerking to which freight-cars are subjected, and are less liable to become bruised and injured; but such crowding increases the discomfort of the cattle and tends to produce a feverish condition. The weak, also, are liable to suffer in a greater degree, and it is impossible for any to rest by lying down, because it is impossible for the prostrate animal to rise again or for those adjacent to keep their feet. Consequently death by trampling nearly always ensues if one of them attempts to lie down. It is impossible to give food and water to cattle crowded together in the cars as they commonly are, and for all these reasons it is necessary to unload frequently for rest and food, or to cause great suffering and loss by long runs without rest or food. By means of cars properly fitted to afford needed rest and permit the proper administration of food and water during transit, shippers can make the saving on longer runs balance the extra expense of the fixtures and care and less crowded cars, and derive an additional profit also from stock delivered in better condition.

I am aware that it has been proposed to accomplish these results in the same general way that I have adopted; but I am not aware that any one has heretofore employed the devices which I have devised nor devices having their mode of operation.

My invention consists generally in a cattle-car fitted, first, with automatic water-buckets, whereby when the requisite quantity of water has been received the supply shall be automatically cut off; second, with a series of water and feed troughs which are pivoted to the side of the car, and which are provided with weights or springs which permit the buckets to yield, so that when properly filled with water the cocks will be automatically closed to prevent waste of water, because those buckets nearest the tank will be first filled and will overflow if the flow of water is not automatically shut off; third, a water-tank on the car or train from which water may be drawn at any time, whether the car is in motion or not, and feed-buckets provided with covers, and a crank-rod with suitable connecting devices, whereby both bucket-covers and water-valves may be controlled; fourth, a series of openings in the roof serve to admit a feed-pipe down to the feed-bucket, so that feed may be distributed while the car is in motion; fifth, a crank-rod connected with hinged covers for the feed-buckets, whereby, if desired, the food may be deposited in the feed-buckets, but access thereto prevented until some certain time; sixth, a peculiar double valve in the water-tank, whereby water may be drawn into either or both pipes at will.

That others may fully understand my invention, I will more particularly describe it.

A is the car, constructed in some proper and approved way. The winches or windlass B are placed transversely across the car near its roof, and each is provided with a ratchet and pawl to hold it from turning backward when properly wound up by a crank, which may be applied outside the car or in any convenient position.

There is a corresponding series of slings or hammocks, C, each of which has one edge supported by chains running to the ceiling of the car and the other edge supported by chains wound around its peculiar windlass B, so that the hammock may be raised or lowered, as desired. When the cattle are stowed in the car they may be placed "heads and tails" in the usual way, and each may be provided with a sling, C, which is wound up just sufficient to touch without incommoding the animal, whereby it is prevented from being thrown off its feet, and is enabled to rest its legs, when tired of standing, by settling its weight down upon the sling. This they soon learn to do.

It is not necessary always to provide each individual, with a sling. If each alternate one is so provided, the unprovided may lie down and get up again without danger of being trampled, because those in slings cannot be thrown down or fall over their neighbors, notwithstanding they may not be so provided.

Along the side of the car there are feed or water buckets E, hung upon hinges, and with springs $q$ or weights behind them, so that when the bucket is full of water the weight of the bucket and its contents pressing against the springs, will yield and sink down so far that the water-cock $d$ will be closed by the action of the bucket-arm $r$ against the cock-lever $t$ and the water shut off. The spring is of sufficient strength to hold the bucket and prevent the closing of the cock until the bucket is sufficiently full. A proper connection between the bucket and cock is provided. Each bucket has also a hinged cover, $k$, and all may be raised by turning a crank-rod, F, which passes along the side of the car, engaging with the lugs $m$ on the covers $k$, and may be operated from the outside.

The roof of the car is provided with a series of openings, G, each of which may be provided with a cover. These openings are directly above the several buckets E, and serve to permit the introduction of a chute or pipe, H, down through the roof and into the bucket E, for the purpose of conducting a proper quantity of food into the bucket without danger of loss in transit and without going inside of the car or within reach of the cattle. In this way each or any one may be served while the train is in motion.

Along the side of the car a water-pipe, D, is placed, and provided with as many valves or spouts $d$ as there are water-buckets. These spouts or valves, I think, may be very easily and cheaply made by providing a rotating sleeve, $e$, as shown, each sleeve being provided with the jet or spout $d$. As I desire to pour water into the bucket when the spout $d$ is in one position or jet it over the animal when said spout is in another position, I make two holes in the pipe D in position so that said spout will uncover one hole when in one position and uncover the other when in the other of said positions, and close both of said holes when in any other position. It is easy to move said sleeves by the crank-rod F and lever L or by other means, if more convenient, either singly or all together, so that water may be poured into the water-buckets or squirted over the animals. I do not, however, desire to confine myself to the sleeve-valves $e$, as it is manifest other well-known valves may be employed.

A water-tank, I, may be placed outside at the end of the car or in some other convenient position; or a single water-tank of larger proportions, and, if necessary, supplied with pumping apparatus, may be mounted on its own car and supply the whole train. In the latter case the water-pipes of the several cars will be connected by flexible hose or pipes J. These will not be required, however, if each car has its own tank.

Supposing the tank I is attached to a single car, as shown, it will be desirable to control the outflow so as to restrict it to one pipe or permit it to flow into both. To accomplish this I place each valve $p$ upon a pivoted lever, $i$, and provide a second lever, L, with a broad lower end, to which the free ends of the levers $i\ i$ are both pivoted, but at some little distance apart. It then becomes possible to open either of said valves without disturbing the other by simply tilting said lever sidewise in effect upon the undisturbed pivot as a center; or by pushing it bodily downward both valves may be opened or closed.

The tank may be provided with a gage, I, so that the attendant may know when the proper quantity has been discharged without inspecting the buckets themselves.

Having described my invention, what I claim as new is—

1. A cattle-car provided with a series of water-buckets hinged to the side of the car and counterbalanced, combined with a water-pipe and valves having suitable connecting devices with said buckets, so that when the requisite quantity of water has been delivered to said buckets they will automatically overcome the counterbalance, which by its downward motion will close said water-valve.

2. A cattle-car provided with a series of feed or water buckets, E, hinged to the side of the car and provided with elastic supports behind them, for the purpose set forth.

3. A cattle-car provided with a water-tank, I, from which water may be drawn at any time, combined with a pipe or pipes attached to the car, whereby water may be delivered to the animals for drink or to wet their skins, buckets E, with covers K and the crank-rod F, and suitable connecting devices, whereby said crank-rod may control the bucket-covers and the water-valve.

4. In a cattle-car, a series of feed-buckets placed against the side of the car, combined with a corresponding series of holes, G, in the roof and a removable chute or pipe, H, adapted to enter said holes to conduct a quantity of food to said buckets from the exterior of the roof.

5. The several buckets E and sleeve-valves $e$, combined with the operative crank-rod F, as set forth.

6. The valves $p$ $p$, each provided with a pivoted valve-lever, $i$ $i$, combined with the lever L, to which said levers $i$ are jointed, whereby said valves may be controlled, as set forth.

7. A cattle-car provided with a set of water-pipes permanently attached and water cocks or valves set therein opposite each of a series of hinged water-buckets, combined with sustaining-springs and valve-connections, whereby when the proper quantity of water has been received the bucket will depress its sustaining-springs and close the water-cock.

MOSES T. RIDOUT.

Witnesses:
W. M. PIERCE,
EDGAR RIDOUT.